(12) United States Patent
Rahmany

(10) Patent No.: US 11,743,421 B2
(45) Date of Patent: Aug. 29, 2023

(54) DEVICE FOR SECURE VIDEO STREAMING

(71) Applicant: FIBERNET LTD., Yokneam Illit (IL)

(72) Inventor: Ilan Rahmany, Ganei Tikva (IL)

(73) Assignee: FIBERNET LTD., Yokneam Illit (IL)

( * ) Notice: Subject to any disclaimer, the term of this patent is extended or adjusted under 35 U.S.C. 154(b) by 5 days.

(21) Appl. No.: 16/838,119

(22) Filed: Apr. 2, 2020

(65) Prior Publication Data

US 2020/0322568 A1  Oct. 8, 2020

(30) Foreign Application Priority Data

Apr. 2, 2019 (IL) .......................................... 265789

(51) Int. Cl.
| | |
|---|---|
| *H04N 7/015* | (2006.01) |
| *H04N 7/22* | (2006.01) |
| *H04N 7/167* | (2011.01) |
| *H04N 7/173* | (2011.01) |

(52) U.S. Cl.
CPC ............ *H04N 7/015* (2013.01); *H04N 7/167* (2013.01); *H04N 7/173* (2013.01); *H04N 7/22* (2013.01)

(58) Field of Classification Search
CPC ................................ H04N 7/015; H04N 7/22
USPC ....................................................... 725/131
See application file for complete search history.

(56) References Cited

U.S. PATENT DOCUMENTS

| | | | |
|---|---|---|---|
| 5,161,021 A * | 11/1992 | Tsai .......................... | H03J 9/06 340/12.22 |
| 6,388,658 B1 | 5/2002 | Ahern et al. | |
| 6,397,269 B1 | 5/2002 | Petty et al. | |
| 6,763,522 B1 * | 7/2004 | Kondo ............... | H04N 5/44591 725/39 |
| 2002/0143996 A1 | 10/2002 | Odryna et al. | |
| 2003/0110328 A1 | 6/2003 | Seki et al. | |
| 2003/0184960 A1 | 10/2003 | Ferguson | |
| 2003/0217123 A1 | 11/2003 | Anderson et al. | |
| 2003/0218578 A1 | 11/2003 | Ahern et al. | |

(Continued)

FOREIGN PATENT DOCUMENTS

| | | |
|---|---|---|
| CN | 202205133 U | 4/2012 |
| CN | 202472359 U | 10/2012 |

(Continued)

OTHER PUBLICATIONS

High Sec Labs, "What is Secure KVMA Isolator?", 2015, https://highseclabs.com/wp-content/uploads/2020/10/HKS100I_HVS100I_DS_Rev1.1.pdf.

(Continued)

*Primary Examiner* — Trang U Tran
(74) *Attorney, Agent, or Firm* — The Roy Gross Law Firm, LLC; Roy Gross

(57) ABSTRACT

A device comprising: at least two interfaces for interconnecting between a video source and a video display, wherein each of said interfaces comprises at least a video data channel and a display settings channel; and unidirectional circuitry; wherein said unidirectional circuitry is configured to allow transmission over said video data channel only from said video source to said video display, and wherein said device is configured to (i) receive, over said display settings channel, display settings data from said video display, and (ii) transmit, over said display settings channel, said display settings data to said video source.

8 Claims, 6 Drawing Sheets

(56) References Cited

U.S. PATENT DOCUMENTS

| | | |
|---|---|---|
| 2004/0062305 A1 | 4/2004 | Dambrackas |
| 2004/0068737 A1* | 4/2004 | Itoh .................. H04N 21/42204 |
| | | 725/14 |
| 2004/0177264 A1 | 9/2004 | Anson et al. |
| 2005/0044184 A1 | 2/2005 | Thomas et al. |
| 2005/0044266 A1 | 2/2005 | O'Neil |
| 2005/0055582 A1 | 3/2005 | Bazakos et al. |
| 2005/0080939 A1 | 4/2005 | Onuma et al. |
| 2005/0286784 A1 | 12/2005 | Gilgen |
| 2005/0289633 A1* | 12/2005 | Dow ...................... H04N 7/163 |
| | | 725/131 |
| 2006/0067690 A1* | 3/2006 | Tatum ...................... H04N 7/22 |
| | | 398/66 |
| 2006/0107061 A1 | 5/2006 | Holovacs |
| 2006/0147214 A1 | 7/2006 | Ruiz et al. |
| 2006/0230110 A1 | 10/2006 | Vanharlingen et al. |
| 2006/0259612 A1 | 11/2006 | De Oliveira et al. |
| 2007/0058657 A1 | 3/2007 | Holt et al. |
| 2007/0085825 A1 | 4/2007 | Geffin et al. |
| 2007/0124474 A1 | 5/2007 | Margulis |
| 2007/0136610 A1* | 6/2007 | Lambinet ........... H04N 21/4334 |
| | | 713/172 |
| 2007/0174526 A1 | 7/2007 | Blackwell et al. |
| 2007/0239900 A1 | 10/2007 | Beasley et al. |
| 2007/0261097 A1 | 11/2007 | Siegman et al. |
| 2007/0296714 A1 | 12/2007 | Kim |
| 2008/0126629 A1 | 5/2008 | Huang |
| 2008/0253085 A1 | 10/2008 | Soffer |
| 2008/0288677 A1 | 11/2008 | Kirshtein |
| 2008/0313319 A1 | 12/2008 | Geffin |
| 2009/0058868 A1 | 3/2009 | Kang et al. |
| 2009/0091665 A1 | 4/2009 | Kang et al. |
| 2009/0109345 A1* | 4/2009 | Nori .................. H04N 21/43615 |
| | | 348/721 |
| 2009/0125969 A1* | 5/2009 | Hill .................... H04N 21/4622 |
| | | 725/143 |
| 2010/0235551 A1 | 9/2010 | Batish et al. |
| 2010/0327059 A1 | 12/2010 | Dean et al. |
| 2011/0026605 A1 | 2/2011 | Costa |
| 2011/0029699 A1 | 2/2011 | Siegman et al. |
| 2011/0032982 A1 | 2/2011 | Costa et al. |
| 2011/0072064 A1 | 3/2011 | Wei et al. |
| 2011/0145451 A1† | 6/2011 | Softer |
| 2011/0208963 A1 | 8/2011 | Soffer |
| 2012/0159651 A1 | 6/2012 | Beacham |
| 2012/0243160 A1 | 9/2012 | Nguyen et al. |
| 2012/0284736 A1* | 11/2012 | Friedman ............... H04H 20/22 |
| | | 725/14 |
| 2013/0050084 A1† | 2/2013 | Soffer |
| 2013/0067534 A1 | 3/2013 | Soffer |
| 2013/0254439 A1 | 9/2013 | Sundaravel |
| 2014/0019652 A1 | 1/2014 | Soffer |
| 2014/0075535 A1 | 3/2014 | Soffer et al. |
| 2014/0172422 A1 | 6/2014 | Hefetz |
| 2014/0244856 A1 | 8/2014 | Kambhatla |
| 2014/0244880 A1 | 8/2014 | Soffer |
| 2015/0082460 A1 | 3/2015 | Amiga |
| 2015/0135264 A1 | 5/2015 | Amiga |
| 2015/0356045 A1 | 12/2015 | Soffer |
| 2016/0066016 A1 | 3/2016 | Yeh et al. |
| 2016/0110303 A1 | 4/2016 | Wei et al. |
| 2016/0227149 A1 | 8/2016 | Dickens et al. |
| 2016/0371511 A1 | 12/2016 | Balducci |
| 2017/0116147 A1 | 4/2017 | Hsueh |
| 2017/0192745 A1 | 7/2017 | Sunstrum |
| 2017/0195374 A1* | 7/2017 | Vu .......................... H04W 4/08 |
| 2017/0229093 A1 | 8/2017 | Sivertsen et al. |
| 2017/0300371 A1 | 10/2017 | Soffer |
| 2018/0101496 A1 | 4/2018 | Chang et al. |
| 2018/0239719 A1 | 8/2018 | Soffer |
| 2018/0316946 A1* | 11/2018 | Todd .................. H04N 21/2665 |
| 2020/0057508 A1 | 2/2020 | Menachem et al. |

FOREIGN PATENT DOCUMENTS

| | | |
|---|---|---|
| CN | 202771332 U | 3/2013 |
| CN | 202854720 U | 4/2013 |
| CN | 203930617 U | 11/2014 |
| KR | 20160015829 A | 2/2016 |
| WO | 2018172111 A1 | 9/2018 |

OTHER PUBLICATIONS

High Sec Labs, "HSA210 Secure Headphone Diode Datasheet", Feb. 4, 2015, https://highseclabs.com/wp-content/uploads/2020/10/HSA210_DS.pdf.

Guri, Mordechai & Solewicz, Yosef & Daidakulov, Andrey & Elovici, Yuval. (2016). Speake(a)R: Turn Speakers to Microphones for Fun and Profit.

http://highseclabs.com/data/HKS1001_HVS1001_DS_Rev1.1.pdf.†

\* cited by examiner
† cited by third party

DEVICE FOR SECURE VIDEO STREAMING

CROSS-REFERENCE TO RELATED APPLICATION

This application claims the benefit of priority of Israeli Patent Application No. 265789 filed Apr. 2, 2019, the contents of which are incorporated herein by reference in their entirety.

FIELD OF THE INVENTION

The present invention relates generally to secured video data streaming in computer systems.

BACKGROUND OF THE INVENTION

In computer and audio-visual systems, one or more display devices (devices receiving video or audio data, such as display monitors) may receive a video signal from a video source (such as a personal computer). In some cases, the signal may be provided remotely, over extended distances.

A security issue may arise out of this arrangement, because the display monitors can be infected with malicious code planted by a hostile entity, which may then reach the video source by sending data back to the video source through a bidirectional connecting cable. In some cases, enforcing a unidirectional signal transmission may block the transmission back of malicious data. However, enforcing complete unidirectional signal transmission may affect the ability of the video source to correctly learn required information about the capabilities and settings of a display monitor, so as to be able to provide video signal in the correct format.

The foregoing examples of the related art and limitations related therewith are intended to be illustrative and not exclusive. Other limitations of the related art will become apparent to those of skill in the art upon a reading of the specification and a study of the figures.

SUMMARY OF THE INVENTION

The following embodiments and aspects thereof are described and illustrated in conjunction with systems, tools and methods which are meant to be exemplary and illustrative, not limiting in scope.

There is provided, in an embodiment, a device comprising at least two interfaces for interconnecting between a video source and a video display, wherein each of said interfaces comprises at least a video data channel and a display settings channel; and unidirectional circuitry; wherein said unidirectional circuitry is configured to allow transmission over said video data channel only from said video source to said video display, and wherein said device is configured to (i) receive, over said display settings channel, display settings data from said video display, and (ii) transmit, over said display settings channel, said display settings data to said video source.

There is also provided, in an embodiment, a method comprising: providing a device comprising at least two interfaces for interconnecting between a video source and a video display, wherein each of said interfaces comprises at least a video data channel and a display settings channel, and unidirectional circuitry configured to allow transmission over said video data channel only from said video source to said video display; receiving, by said device, over said display settings channel, display settings data from said video display; and transmitting, by said device, over said display settings channel, said display settings data to said video source.

In some embodiments, said device further comprises a switching unit configured to (i) connect only to said display settings channel of said video display during said receiving; and (ii) connect only to said display settings channel of said video source during said transmitting. In some embodiments, said method further comprises operating said switching unit to (i) connect only to said display settings channel of said video display during said receiving; and (ii) connect only to said display settings channel of said video source during said transmitting.

In some embodiments, said device further comprises a non-transitory computer-readable storage medium configured to store said display settings data. In some embodiments, said method further comprises storing said display settings data in said storage non-transitory computer-readable medium.

In some embodiments, said storage is write-protected during at least said transmitting. In some embodiments, said interfaces are selected from the group consisting of: ITU-R BT.656, VGA, DVI, HDMI, DisplayPort, and LCD interface.

In some embodiments, said unidirectional circuitry comprises a Transmitter Optical Sub-Assembly (TOSA) and a Receiver Optical Sub-Assembly (ROSA).

In addition to the exemplary aspects and embodiments described above, further aspects and embodiments will become apparent by reference to the figures and by study of the following detailed description.

BRIEF DESCRIPTION OF THE DRAWINGS

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION OF THE INVENTION

Disclosed are a device and a method for secure selective transmission of video data from a video source, such as a display controller, to at least one display device, such as a computer monitor, video projector, or digital television.

Figure 1:
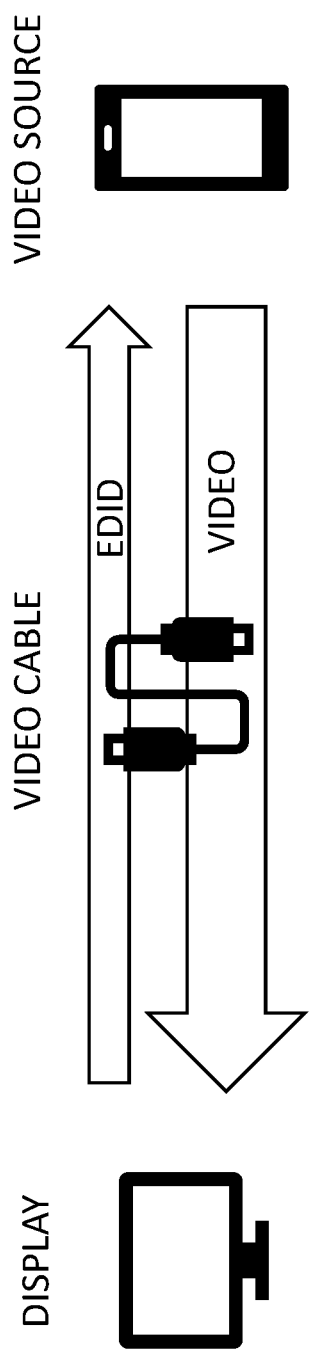
FIG. 1 illustrates a typical video streaming arrangement.

In a typical video data connection, a connecting cable (e.g., S-Video, component video, VGA, DVI, HDMI, DisplayPort, etc.) between a video source and display device provides for the bi-directional transmission of data. Thus, video data may be transmitted to the display, while other data, such as settings information, may be transmitted back to the video source from the display. Such an arrangement is shown in FIG. 1. In this arrangement, a video source device (e.g. a computer as shown) is connected directly to a display. Video data is transmitted to the display, while settings data (using, e.g., the EDID format) is transmitted to the video source. This allows the video source to directly read the display's EDID. In some cases, such as with HDMI, the interface provides for one or more pins dedicated to data transmission to the video source. For example, pin 13 provides for consumer electronic control (CEC) of the video source, while other pins provide for transmitting of EDID settings information.

However, allowing bi-directional data transmission between a video source and a display presents a security risk. For example, a malicious code planted in the display can then be transmitted back to the video source and infect it, and potentially other devices in a network to which it is connected.

It is possible to enforce complete unidirectionality of data transmission (i.e., only allowing transmission of video data from video source to display) and/or to disconnect some of the lines transmitting information back to the video source. However, although this may be advantageous from a security perspective, it may cause severe operational problems with modern computers and software. Modern computer operating systems and display card drivers may adjust display resolution to default settings if no display EDID is detected. In some cases, computers may even not generate video signals at all.

In some embodiments, the present device enables video processing equipment to be inserted between a video source and a display while still enabling the source to transmit the correct video format. In one embodiment, the video processing equipment is connected between a video source and a display, and reads the entire EDID from the display. The pertinent information from the display's EDID is then presented as the device's EDID, thus emulating the display. In other embodiments, the device allows a signal generating device in one location to be provided with an emulated EDID over a network to make it "think" that it is communicating directly with a display that is located at a remote location, when in fact it is communicating with other hardware that is interposed between the source and the display. This allows the video source to match the requirements of the display.

Accordingly, in some embodiments, the present device provides for enforcing unidirectional data transmission from the video source to the display devices only, while preventing data transmission in the opposite direction, e.g., when the video source reads information from the display. In some embodiments, the present device further provides for the communication of correct capabilities and settings information regarding the display device to the video source, while blocking the passing of other data.

In some embodiments, such unidirectional data communication allows the communication to flow in one direction only, by applying a physical layer which blocks the communication signals from flowing in the opposite direction.

In other implementations of the current invention, the unidirectional flow enforcing circuitry also provides galvanic isolation between the input and the output sections of the device.

In some embodiments, the present device operates first in a read mode in which a storage unit in the device is configured to read and store the EDID from the display, while disconnecting at least some of the lines transmitting information back to the video source. In some embodiments, the present device may then operate in a write mode, in which the EDID information is written to a storage device that is connected to the video source, while disconnecting the DDC line to the display and connecting the source DDC lines to the storage device. Accordingly, at no time are there any bi-directional data connections between the video source and the display.

In some embodiments, the present device is configured to provide pre-stored EDID information for various signal resolutions. In some embodiments, the pre-stored settings are selected automatically and/or based on user selection.

In some embodiments there is only pre-stored EDID information and there is no reading of display EDID in some embodiments the display DDC lines are not connected at all.

In some embodiments, the video source is a computer system and the display devices are one or more display monitors. However, other video sources and display devices may be used in conjunction with the present invention. In some embodiments, the video transmission is conducted over extended distances.

In some embodiments, the capabilities and settings of the display device are passed to the video source using the Display Data Channel (DDC) protocol defined by the Video Electronics Standards Association (VESA). In some embodiments, the capabilities and settings data are in the Extended Display Identification Data (EDID) format defined by VESA. In some embodiments, other data format may be used, such as, but not limited to, E-EDID and Display ID.

EDID contains information about a display's manufacturer, screen size, native resolution, color characteristics, frequency range limits and more. Once the video source receives this information, it can then generate the necessary video characteristics to match the needs of the display. EDID is often used with a computer graphics card as the source device. Additionally, HDTV receivers, DVD and Blu-Ray players, LCD displays and digital TVs can read EDID and output the required video format. EDID information packets may contain information which identifies the display manufacturer and product, EDID version, display parameters and features (e.g., whether the display accepts analog or digital inputs, sync types, maximum horizontal and vertical size of the display, gamma transfer characteristics, power management capabilities, color space, and default video timing), the RGB color space conversion technique to be used by the display, and a VESA-established video resolutions and timings that are supported by the display.

In some embodiments, the present device enables the transmission of video data over extended distances.

In some embodiments, the present device acts as a connection intermediary between one or more video sources and one or more displays.

Figure 2:
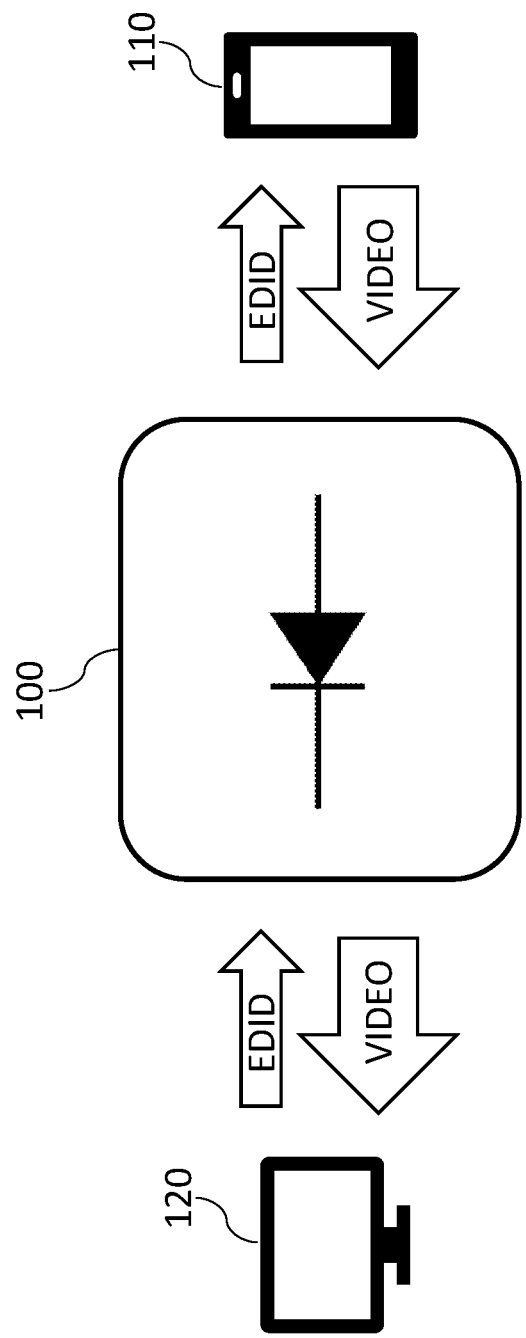
FIG. 2 is a schematic diagram of a video source and display interconnected with a secure video transmission device of the present invention.

FIG. 2 is a schematic diagram of a video source 110 and display 120 interconnected with a secure video transmission device 100 of the present invention. In some embodiments, video transmission device 100 is configured to at least:

(i) Provide for transmitting video data from video source 110 to display 120;

(ii) prevent data transmission from display 120 to video source 110; and (iii) enable proper transmission of EDID information back to the video source.

Figure 3A:
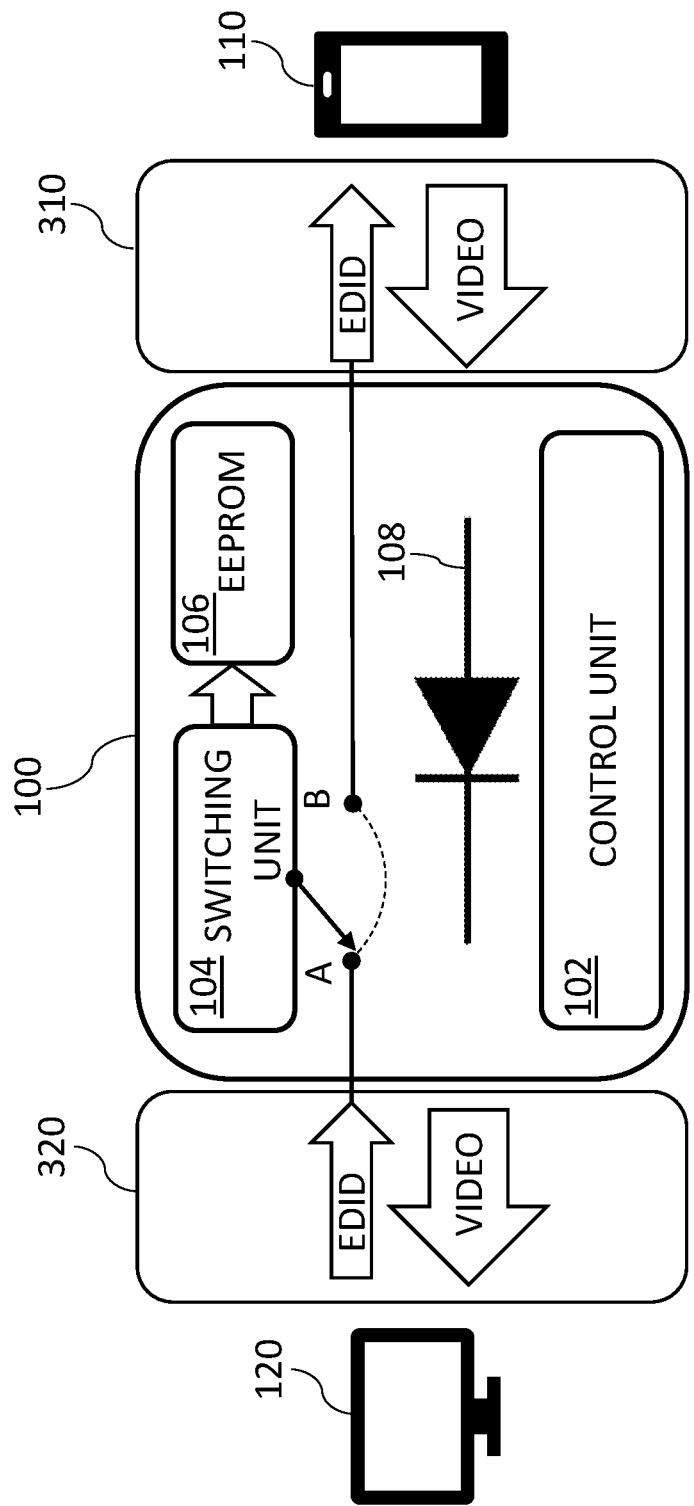
FIGS. 3A-3B depict an exemplary secure video transmission device of the present invention.
Figure 3B:
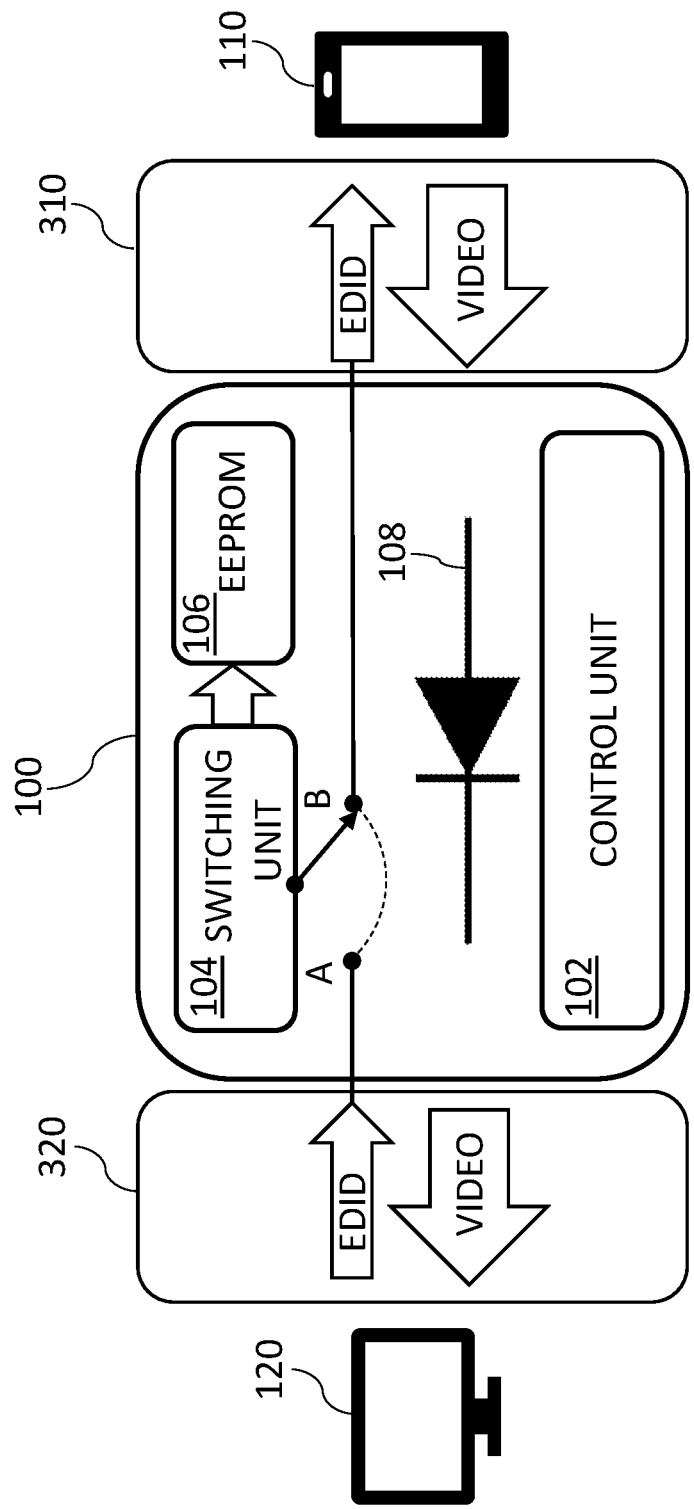

FIGS. 3A-3B depict an exemplary device 100 in greater detail, in 'EDID read' and 'EDID write' modes, respectively. Device 100 may comprise a control unit 102 comprising one or more hardware processors; a switching unit 104; a non-transitory computer-readable storage device 106, which may comprise, e.g., an EEPROM (Electrically Erasable Programmable Read Only Memory); and a unidirectional circuit 108. System 100 as described herein is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. In various embodiments, system 100 may comprise one or more dedicated hardware devices, one or more software modules, and/or may form an addition to or extension to an existing device. In some embodiments, device 100 may be configured to connect to the video source via, e.g., an HDMI connector. In some embodiments, the connection is to a display port, wherein device 100 (in some cases 108) may further be configured to convert a video signal to another protocol, e.g. DisplayPort to HDMI. In some embodiments, device 100 may comprise a relatively small dongle or similar device configured for connecting to a port.

Storage medium 106 may further have encoded thereon software instructions or components configured to operate a processing unit (also "hardware processor," "CPU," or simply "processor"), such as control unit 102. In some embodiments, the software components may include an operating system, including various software components and/or drivers for controlling and managing general system tasks (e.g., memory management, storage device control, power management, etc.), and facilitating communication between various hardware and software components. In some embodiments, the program instructions are segmented into one or more software modules.

In some embodiments, switching unit 104 may be configured to alternately connect only to the display side (e.g., when switched to point A), or only to the video source side (e.g., when switched to point B), while simultaneously disconnecting the opposite side, so as to ensure that no DDC channels are connected between the videos source and the display at any time.

In some embodiments, disconnecting from one of the display side and/or the video source side may comprise disconnecting, e.g., device 100 as a whole. In some embodiments, such disconnecting may comprise only internally disconnecting and/or isolating storage device 106 and/or one or more additional or other internal components and/or modules of device 100.

In some embodiments, unidirectional circuit 108 allows for the data communication to flow in one direction only, by using a physical layer which blocks the communication signals from flowing in the opposite direction.

In some embodiments, the video streaming may involve connecting an RGB (e.g., 15 pin D-subminiature), HDMI, DVI, or DisplayPort cable from the video source to device 100, and form device 100 to the display. In some embodiments, device 100 reads the EDID from the display by, e.g., connecting to the I2C/DDC lines on the RGB/HDMI/DVI, DisplayPort cable, and initiating an I2C/DDC read from the EDID in the display.

In some embodiments, the pertinent information from the display's EDID is then written to storage device and presented to the video source. In some embodiments, the EDID is presented as the EDID of device 100, thus emulating the display. In this step, hardware of device 100 can write the data that was read from the display's EDID to the appropriate video input port where the video source's VGA, HDMI, DVI, or DisplayPort cable is connected. Consequently, any future EDID reads by the source over the VGA, HDMI, DVI, or DisplayPort cable will be read by the video source as if device 100 were the display. Thus, the video source or signal-generating device receives an emulated EDID that makes it "think" that it is communicating directly with the display. This allows the video source to continuously match the requirements of the display.

In some embodiments the EDID data is manipulate before written to the storage device.

In some embodiments the emulated EDID is pre-stored to the storage device (default EDID data), and in some embodiments it is permanent and never changes.

In some embodiments, the video data transmission may comprise an HDMI connection designed to transmit the video stream to display 120, wherein the HDMI signals comprise the Transition-Minimized-Differential-Signaling, also known as TMDS.

Figure 4:
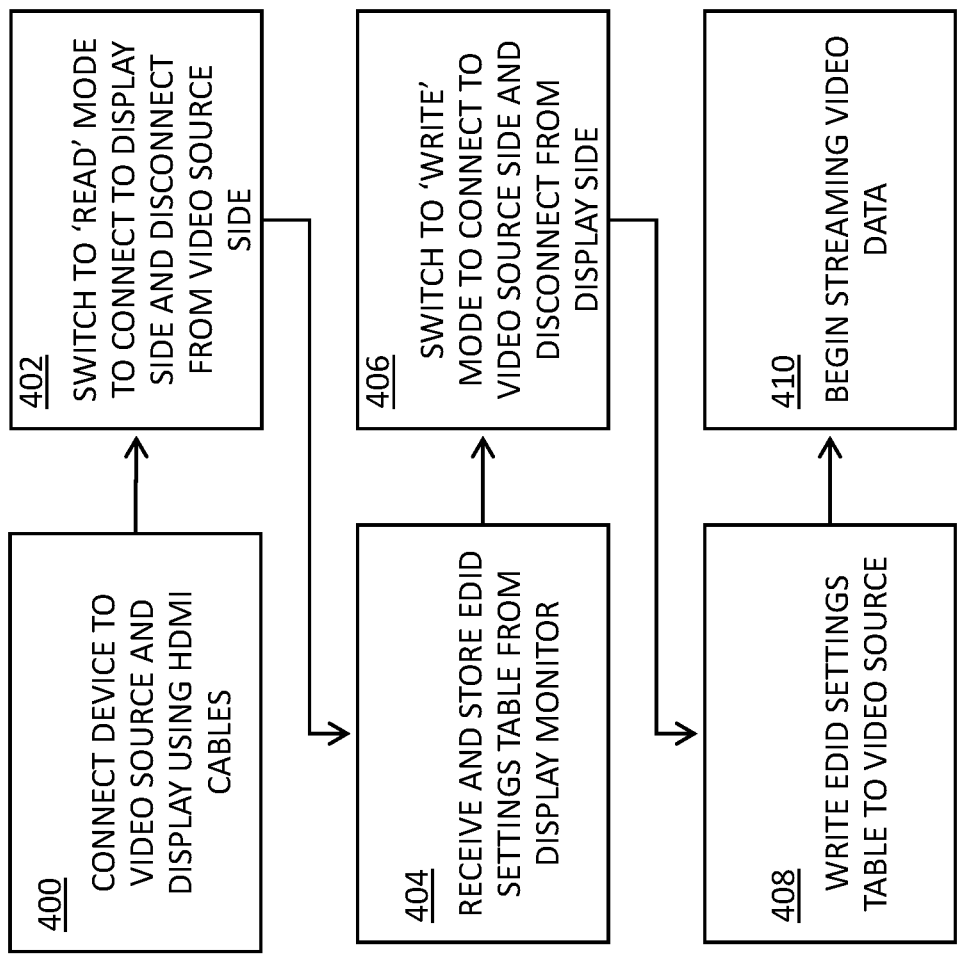
FIG. 4 is a flowchart of the functional steps in setting up and using a secure video transmission of the present invention.

The functional steps in using device 100 will now be described with reference to the flowchart in FIG. 4.

At a step 400, device 100 may be connected to video source 110 and to display 120 using, e.g., HDMI cables.

Figure 3C:
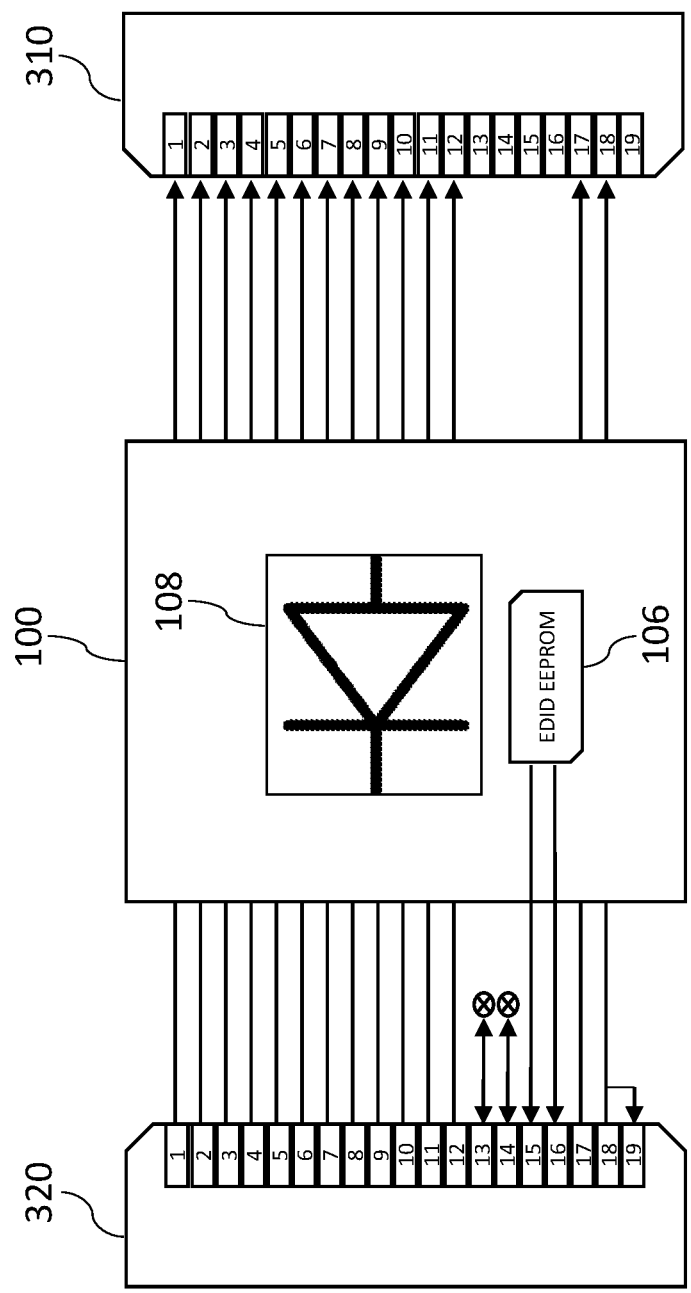
FIG. 3C depicts a connection scheme of an exemplary secure video transmission device of the present invention.

With reference to FIGS. 3A-3C, in some embodiments, device 100 may by connected to HDMI connections, e.g., connection 310 on the video source side, and connection 320 on the display side. In some embodiments, at least some of the transmission wires and pins in the HDMI connections may be physically disconnected by device 100. For example, device 100 may be configured to physically disconnect pins 13-14 of the HDMI connection 320 on the display side, so as to prevent data transmission to the video source side from these pins.

In some embodiments, device 100 may be configured to transmit at least some of the pins of the HDMI connections through unidirectional circuit 108. For example, device 100 may be configured to transmit pins 1-12 and 17-19, which carry video data, through unidirectional circuit 108.

In some embodiments, device 100 may be configured to route EDID pins 15-16 through a switching process which shall be described in more detail below.

At a step 402, switching unit 104 may be set to connect to point A, e.g., to (i) connect to the DDC channel in HDMI connection 320 on the display side, and (ii) disconnect from the DDC channel in connection 310, as shown in FIG. 3A. In this mode, switching unit 104 may receive and transmit for storage in storage unit 106 the EDID settings table from the display through, e.g., pins 15-16 of connection 320. Because during this mode switching unit 104 disconnects from DDC channel in connection 310, data cannot be transmitted on the EDID lines from display 110 to video source 120.

At a following step 404, storage unit 106 may be configured to receive and store the EDID settings table from display 110. The EDID settings table received by device 100 may be a parameter array comprising the parameters required to define the display type and functionalities. In some cases, device 100 may be configured to receive the display parameters of the EDID settings table via the DDC pins of HDMI connection 320, and transmit these parameters to storage unit 106 to be stored. In some other cases, only a narrow portion of the parameters of the EDID settings table may be transmitted and eventually stored in storage unit 106.

In some cases, the EDID settings table may be compliant with the EDID technical standards as defined by VESA. In some other cases, the EDID settings table may be narrowed or different from the EDID technical standards as defined by VESA. For example, the EDID settings table may be narrowed from the 128-byte standard table. In some cases, the EDID settings table may comprise an extension for the basic 128-byte standard table. For example, the EDID settings table may comprise an additional 128-byte blocks of data to describe increased capabilities. In some embodiments of the present invention, the parameters of the EDID settings table may be received via the DDC pins of the HDMI connection 320 which may be connected to the display.

At a step 406, switching unit 104 may be set to connect to point B, e.g., to (i) connect to the DDC channel in connection 310, and (ii) disconnect from the DDC channel in HDMI connection 320 on the display side, as shown in FIG. 3B. In some embodiments, when switching unit 10 connects to point B, storage unit 106 may be configured to automatically switch to a 'read only' mode, in which data cannot be written to storage unit 106.

At a step 408, video source 110 may be configured to connect to storage unit 106 via, e.g., switching unit 104, to read the EDID settings table, as shown in FIG. 3B.

At a step 410, video source 110 may begin to transmit the video stream accordingly, via unidirectional circuit 108. In some embodiments, unidirectional circuit 108 comprises, e.g., a TOSA-ROSA (Transmitter Optical Sub-Assembly/ Receive Optical Sub-Assembly) for converting electrical signals to optical signals conveyed into an optical fiber. Thus, using optical fibers can provide a unidirectional communication at the physical layer level which allows communication signals to pass in one direction and blocks communication from passing in the opposite direction. In other embodiments, other types of unidirectional circuits may be used, e.g., a unidirectional buffer.

In some embodiments, switching unit 104 may be configured to be controlled by a user through, e.g., a manual switch. Such manual control may be used to manually read the EDID settings table from display 120 to storage unit 106. For example, the user may have a manual button or a switch which can be used in order to connect between switching unit 104 and connection 320 to first read the EDID settings table and write the EDID settings table to the storage device, and then to disconnect from connection 320 and connect to connection 310. So that the video source 110 can read the EDID settings table. In some cases, said manual button or the switch may be configured such that upon pressing the button or switch, switching unit 104 may connect to connection 320, and upon releasing the button or switch, the switching unit 104 may disconnect from connection 320 and connect to connection 310. In some embodiments of the present invention an automatic mechanism may be employed in order to operate switching unit 104.

In some embodiments, switching unit 104 may be user-controlled and/or operated, such that the switching from point A to B in FIGS. 3A-3B may be manually controlled by a user of the device.

In some embodiments, control unit 102 can manipulate and configure the EDID settings table according to some predefined rules. For example, control unit 102 may remove specific EDID variables from the original EDID settings table in order to meet the security requirements defined by a user.

In some embodiments, after the EDID settings table has been received by the video source, switching unit 104 may be configured to remain disconnected from the display, e.g., the DDC channels in connection 320.

In some other cases, a user may be required to manually initialize the connection/disconnection of the DDC channels. In some embodiments, the disconnecting of the DDC channels creates a physical block which prevents the DDC channel from transmitting any data between the display side 120 and the video source side 110.

In some embodiments, the hardware associated with the embodiments outlined above can be physically arranged in many different ways. For example, device 100 can be physically located in the location as the video source, or it can be separated some distance. Likewise, the display can be located in the same location, or they can be separated.

In some embodiments, more than one devices 100 may be interconnected through a computer network, for example, in remote video conference systems, where the video source is a camera, associated with a first video conference room, and the display is associated with a second video conference room and displays the images taken by the camera. An inverse system can also be provided with a camera in the second video conference room that acts as a source for a display in the first video conference room. This allows participants in each room to see and hear each other in real time. It is to be appreciated that the first and second video conference rooms can be relatively near to each other or very far away.

Additional embodiments of device 100 can be configured to allow user control or input of EDID information. For example, a user interface can be associated with device 100. The user interface can include a data entry device (e.g. a keyboard) and a feedback device (e.g. a display screen) to assist the user in entering data. Such a user interface can allow direct input of data that affects the operation of device 100. This configuration allows a user to manually create an EDID and store it in the video processor, or to edit or manipulate EDID information that resides in the video processor. This new EDID can then be presented to the video source so that the video source will output video according to this new EDID. This can be useful for adjusting an EDID or for video testing.

In some embodiments, EDID information may be accumulated and stored in device 100. For example, all previous EDIDs could be stored in device 100 (e.g., on storage unit 106) and then be selected to be presented as the device 100 EDID to the video source. This way the video processing hardware does not have to currently be connected to an EDID (directly or over the network) in order to present that EDID to the video source. This can allow for greater flexibility in hardware configurations.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A device comprising:
    at least two interfaces for interconnecting between a video source and a video display, wherein each of said interfaces comprises at least a video data channel and a display settings channel, and wherein said video source is a computer;
    unidirectional circuitry;
    a switching unit; and
    a storage unit,
    wherein said unidirectional circuitry is configured to allow transmission over said video data channel only from said video source to said video display while preventing transmission in the opposite direction, and
    wherein said switching unit is configured to:
    (i) in a read mode, connect said storage unit to said video display to receive and store said display settings data from said video display, and simultaneously disconnect said storage unit from said video source, and (ii) in a write mode, connect said storage unit to said video source to write said display settings data to said video source, and simultaneously disconnect said storage unit from said video display.

2. The device of claim 1, wherein said storage is write-protected at least in said write mode.

3. The device of claim 1, wherein said interfaces are selected from the group consisting of: ITU-R BT.656, VGA, DVI, HDMI, DisplayPort, and LCD interface.

4. The device of claim 1, wherein said unidirectional circuitry comprises a Transmitter Optical Sub-Assembly (TOSA) and a Receiver Optical Sub-Assembly (ROSA).

5. A method comprising:
providing a device comprising:
at least two interfaces for interconnecting between a video source and a video display, wherein each of said interfaces comprises at least a video data channel and a display settings channel, and wherein said video source is a computer,
unidirectional circuitry configured to allow transmission over said video data channel only from said video source to said video display while preventing transmission in the opposite direction,
a switching unit, and
a storage unit; and
operating said switching unit to:
(i) in a read mode, connect said storage unit to said video display to receive and store said display settings data from said video display, and simultaneously disconnect said storage unit from said video source, and
(ii) in a write mode, connect said storage unit to said video source to write said display settings data to said video source, and simultaneously disconnect said storage unit from said video display.

6. The method of claim 5, wherein said storage is write-protected at least in said write mode.

7. The method of claim 5, wherein said interfaces are selected from the group consisting of: ITU-R BT.656, VGA, DVI, HDMI, DisplayPort, and LCD interface.

8. The method of claim 5, wherein said unidirectional circuitry comprises a Transmitter Optical Sub-Assembly (TOSA) and a Receiver Optical Sub-Assembly (ROSA).

* * * * *